(12) United States Patent  
Tyler et al.

(10) Patent No.: US 9,496,539 B2
(45) Date of Patent: Nov. 15, 2016

(54) CURRENT COLLECTOR FOR AN ELECTROMECHANICAL CELL

(75) Inventors: Matthew R. Tyler, Brown Deer, WI (US); Jason D. Fuhr, Sussex, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 863 days.

(21) Appl. No.: 13/571,144

(22) Filed: Aug. 9, 2012

(65) Prior Publication Data

US 2013/0040176 A1 Feb. 14, 2013

Related U.S. Application Data

(60) Provisional application No. 61/523,075, filed on Aug. 12, 2011.

(51) Int. Cl.

| H01M 2/26 | (2006.01) |
|---|---|
| H01M 2/12 | (2006.01) |
| H01M 2/34 | (2006.01) |
| H01M 4/70 | (2006.01) |
| H01M 10/04 | (2006.01) |
| H01M 4/74 | (2006.01) |

(52) U.S. Cl.
CPC ............ *H01M 2/26* (2013.01); *H01M 2/1235* (2013.01); *H01M 2/345* (2013.01); *H01M 4/70* (2013.01); *H01M 4/742* (2013.01); *H01M 10/0422* (2013.01); *H01M 2/263* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| 5,853,912 | A | 12/1998 | Naing et al. |
|---|---|---|---|
| 2006/0210880 | A1 | 9/2006 | Howard et al. |
| 2006/0228620 | A1 | 10/2006 | Martinson et al. |
| 2007/0009785 | A1 | 1/2007 | Kozuki et al. |
| 2008/0070098 | A1 | 3/2008 | Ray et al. |
| 2008/0131769 | A1 | 6/2008 | Sato et al. |
| 2009/0274949 | A1 | 11/2009 | Meguro |
| 2011/0256433 | A1 | 10/2011 | Fuhr et al. |

FOREIGN PATENT DOCUMENTS

| EP | 0785585 A1 | 7/1997 |
|---|---|---|
| EP | 0959508 A1 | 11/1999 |
| EP | 2270899 A1 | 1/2011 |
| WO | 2010059957 A2 | 5/2010 |

OTHER PUBLICATIONS

U.S. Appl. No. 13/571,183, filed Aug. 9, 2012, Fuhr et al.
International Search Report and Written Opinion for PCT No. PCT/US2012/058482 dated Jan. 7, 2013; 16 pages.

*Primary Examiner* — Sarah A Slifka
(74) *Attorney, Agent, or Firm* — Fletcher Yoder, P.C.

(57) ABSTRACT

A current collector with improved flexibility and electrical conductivity includes at least one flexible leg coupled to a central portion of the current collector. The flexible leg extends substantially orthogonally to the central portion when a force is applied to the central portion. Specifically, the at least one flexible leg extends at least 16 percent of the outer width when a 1000 Newton loading is applied between the central portion and the outer portion.

16 Claims, 7 Drawing Sheets

CURRENT COLLECTOR FOR AN ELECTROMECHANICAL CELL

CROSS REFERENCE TO RELATED APPLICATIONS

This application is a Non-Provisional Application of U.S. Provisional Patent Application No. 61/523,075, entitled "Current Collector for an Electrochemical Cell," filed Aug. 12, 2011, which is herein incorporated by reference in its entirety for all purposes.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles" (xEVs)) may provide a number of advantages as compared to more traditional gas-powered vehicles using internal combustion engines. For example, electric vehicles may produce fewer undesirable emission products and may exhibit greater fuel efficiency as compared to vehicles using internal combustion engines. In some cases, such vehicles may eliminate the use of gasoline entirely, as is the case of certain types of EVs.

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

Accordingly, the battery may include features that are responsible for monitoring and controlling the electrical performance of the battery, managing the thermal behavior of the battery, and containing and/or routing of effluent (e.g., gases that may be vented from the battery) produced by the battery. To enable the venting of effluent, the battery may include a current collector designed to create an opening within a battery housing of the battery. The current collector is a thin metal element having a central portion, an outer portion, and multiple legs connecting the central portion to the outer portion. Relative movement of the central and outer portions creates the opening, thereby allowing the effluent to escape from the battery housing.

It is desirable for the current collector to be electrically conductive and mechanically strong (e.g., able to withstand stress and strain), while still being able to provide an opening for vent gases to escape. Greater electrical conductivity of the current collector improves the performance of the battery during operation. Providing a larger opening enables the battery to vent gases at a higher rate. Unfortunately, typical current collector designs have a trade-off between electrical conductivity and the size of the opening. That is, designing a current collector to provide a larger opening often reduces its electrical conductivity. Conversely, designing a current collector with a higher conductivity comes at the expense of a smaller opening. It is desirable to provide a current collector that creates a larger opening to vent gases more effectively, along with improved electrical conductivity, for use in batteries and battery systems.

SUMMARY

A current collector that creates a larger opening with improved electrical conductivity is provided. In particular, the current collector includes a substantially flat central portion surrounded by a substantially flat outer portion, which defines an outer width. At least one flexible leg is coupled to the outer portion and the central portion. The at least one flexible leg provides flexibility to the current collector. That is, the at least one flexible leg extends substantially orthogonally to the central portion when a force is applied between the outer portion and the central portion. Specifically, the at least one flexible leg extends at least 16 percent of the outer width when a 1000 Newton loading is applied between the central portion and the outer portion. The extension of the at least one flexible leg causes relative movement between the central portion and the outer portion, which forms an opening therebetween. When the current collector is disposed within a battery, the opening enables vent gases to escape from the battery.

The current collector may also include at least one fixed leg that is coupled to the outer portion but not to the central portion. The at least one fixed leg defines an electrical contact length from the outer portion toward the central portion. The at least one fixed leg is conductively coupled to provide electrical conductivity along the electrical contact length. Specifically, the electrical contact length is at least 30 percent of the outer width of the outer portion of the current collector. The increased electrical contact between the current collector and the battery cell improves the performance of the battery.

DRAWINGS

The disclosure will become more fully understood from the following detailed description, taken in conjunction with the accompanying figures, wherein like reference numerals refer to like elements, in which.

DETAILED DESCRIPTION

In accordance with presently disclosed embodiments, provided herein are batteries with features to enable the battery to release vent gases, thereby improving the operability of the battery. In particular, the battery includes a current collector that may extend to create an opening within a battery housing, allowing for the release of vent gases. The current collector includes at least one flexible leg to provide a larger opening to vent gases more efficiently. In addition, the current collector may include at least one fixed leg to increase the electrical conductivity of the current collector.

Typical current collector designs employ legs where a portion of each leg is fixed (e.g., welded to the battery cell), and where a portion is left to flex in response to gas pressure to open the battery housing to allow the gas to vent. This subdivision within the legs creates an unfortunate tradeoff between flexibility and electrical conductivity. In other words, providing a greater area on the leg for one purpose (e.g., electrical conductivity) inherently decreases the available area for the other purpose (e.g., creating the opening). Thus, the present disclosure provides separate legs that are designed for substantially singular purposes (e.g., either electrical conductivity or to create the opening) to increase the opening size and the electrical conductivity of the current collector.

Figure 1:
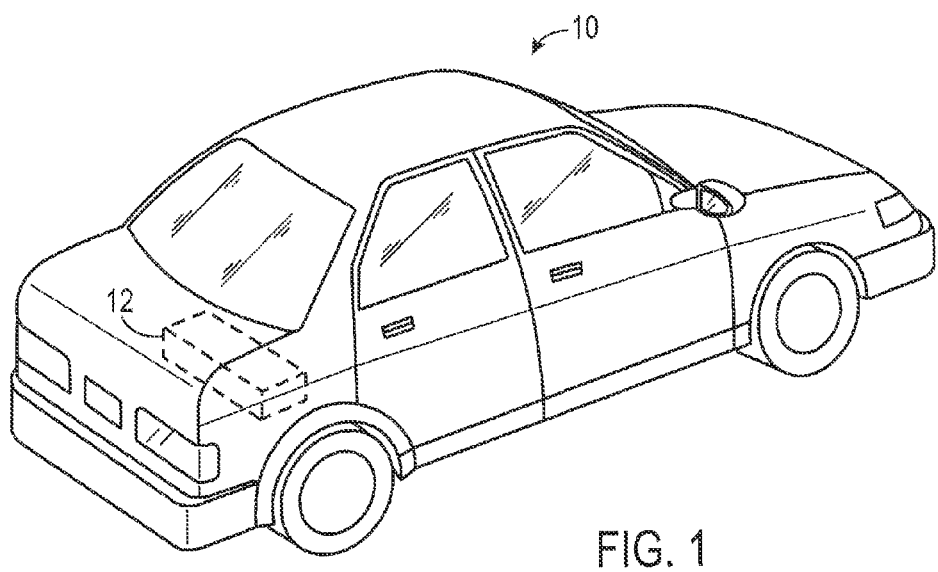
FIG. 1 is a perspective view of an embodiment of a vehicle having a battery system to provide power for various components of the vehicle.

Turning now to the figures, FIG. 1 is a perspective view of an embodiment of a vehicle 10 in the form of an automobile (e.g., a car) having a battery system 12 for providing power to various components of the vehicle 10. For example, the battery system 12 may provide all or a portion of the motive power for the vehicle 10. Such a vehicle 10 may be an electric vehicle (EV), a hybrid electric vehicle (HEV), a plug-in hybrid electric vehicle (PHEV), or another type of vehicle using electric power for propulsion.

Although the vehicle 10 is illustrated as a car in FIG. 1, the type of vehicle may differ according to other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power. In order to use electrical power to propel the vehicle 10, the vehicle 10 may include various internal components, such as a motor, a transmission system, and the like.

Figure 2:
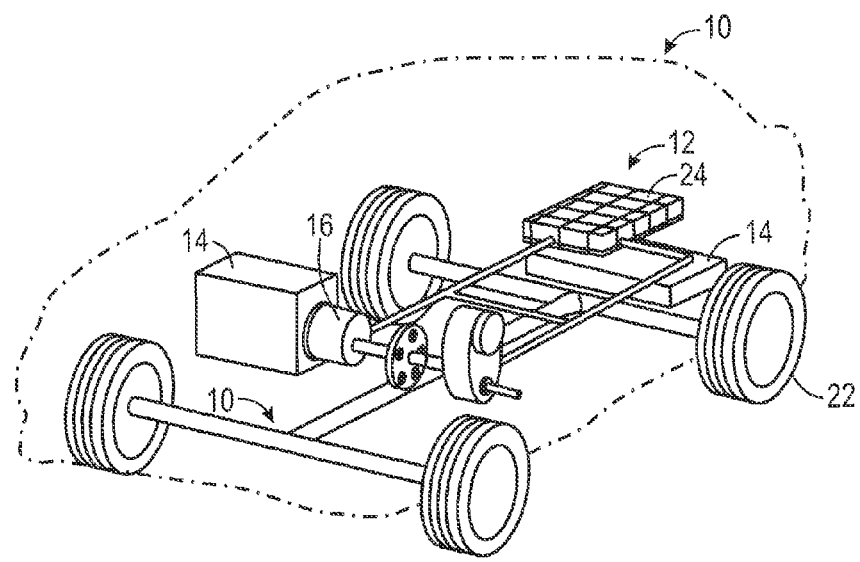
FIG. 2 is a cutaway schematic view of an embodiment of the vehicle and the battery system of FIG. 1.

The various internal components of the vehicle 10 are illustrated in greater detail with respect to FIG. 2. In particular, FIG. 2 is a cutaway schematic view of the vehicle 10. The battery system 12 is provided toward the rear of the vehicle 10 proximate a fuel tank 14. It should be noted that the battery system 12 may be located in various areas within the vehicle 10, such as immediately adjacent the fuel tank 14 or in a separate compartment of the vehicle 10. The battery system 12 is used to provide power to an electric motor 16, which, in turn, may provide all or a portion of the motive power for the vehicle 10. An internal combustion engine 18 may also be used to provide a portion of the motive power for the vehicle 10.

As shown, the electric motor 16 and the engine 18 are coupled to a transmission system 20 to provide motive power for the vehicle. The transmission system 20 provides a controlled application of power from the electric motor 16 and the engine 18 to a plurality of wheels 22. As noted earlier, the type of the vehicle 10 may differ, and the number of wheels may also differ accordingly. For example, the vehicle 10 may have 2 wheels (e.g., a motorcycle), 3 wheels (e.g., an all-terrain vehicle), 4 wheels (e.g., a car), or 5 or more wheels (e.g., a truck, bus, and the like).

The electric motor 16 is powered by a plurality of electrochemical cells or batteries 24 within the battery system 12. That is, the batteries 24 supply electrical energy to the electric motor 16, which converts the electrical energy into mechanical energy to rotate the wheels 22. The batteries 24 include various components to enable the transfer of energy to the electric motor 16, which is explained in greater detail with respect to FIG. 3.

Figure 3:
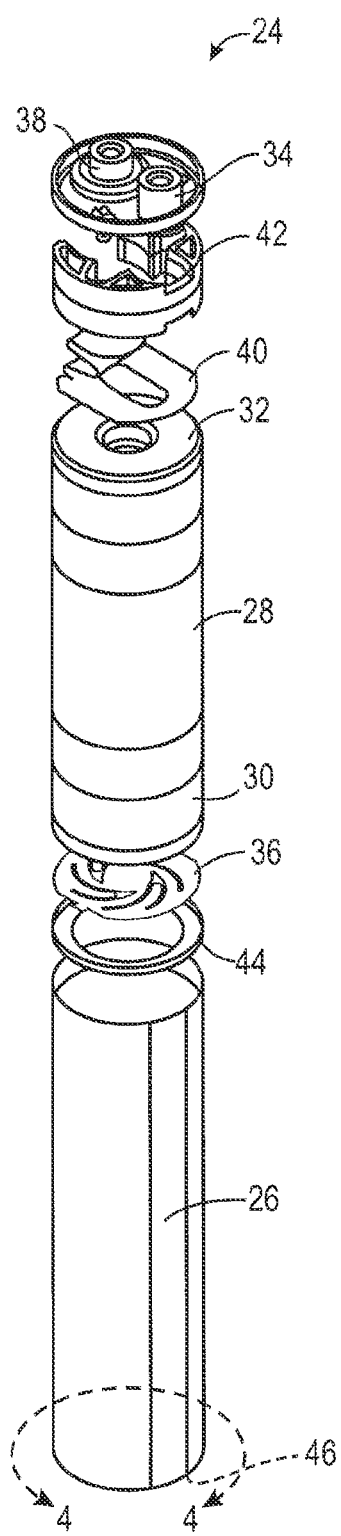
FIG. 3 is an exploded view of an embodiment of a battery that may be used within the battery system of FIG. 1.

To illustrate the components of the battery 24, FIG. 3 is an exploded view of an embodiment of the battery 24 used to supply power to the electric motor 16. As shown, components of the battery 24 are contained within a generally cylindrical battery housing 26. However, the shape of the housing 26 may vary according to implementation-specific designs, and may be prismatic, polyhedral, or any other suitable shape.

The battery 24 includes a cell element 28, which includes an electrolyte (e.g., lithium, nickel-metal-hydride, lead, and the like). The electrolyte stores chemical potential energy that may later be converted into electrical energy for the electric motor 16 of FIG. 2. In particular, the cell element 28 includes a positive electrode 30 and a negative electrode 32. The positive electrode 30 is coupled to a positive terminal 34 of the battery 24 via a positive current collector 36. Likewise, the negative electrode 32 is coupled to a negative terminal 38 of the battery 24 through a negative current collector 40. Insulating spacers 42 and 44 electrically isolate the positive and negative electrodes 30 and 32 from each other. In summary, when an electrical connection is made between the positive and negative terminals 34 and 38 of the battery 24, an electrical circuit is formed between the positive and negative electrodes 30 and 32, thereby allowing current to flow from the battery 24.

Gases may accumulate within the battery housing 26 as a result of the chemical reactions occurring within the cell element 28. Build-up of these gases may increase the pressure within the battery housing 26, thereby reducing the operability of the battery 24. If the pressure becomes great enough, it may be is desirable to vent the gases to relieve the pressure within the battery housing 26. To this end, the battery 24 is equipped with a vent disk 46 that may separate from the battery housing 26 to enable trapped gases to escape, as is more readily seen in FIGS. 4 and 5.

Figure 4:
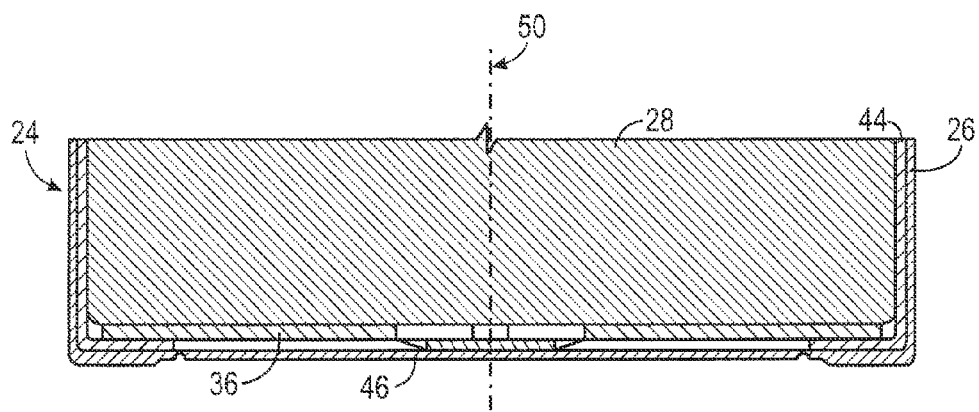
FIG. 4 is a partial cross-sectional view of an embodiment of the battery of FIG. 3, illustrating a current collector in a non-extended position to contain gases produced by the battery.

To illustrate the closed position of the vent disk 46, FIG. 4 is a partial cross-sectional view of the battery housing 26 taken along line 4-4 of FIG. 3. As shown, the vent disk 46 is coupled to the housing 26 and to the cell element 28. While the vent disk 46 is connected to the housing 26, gases formed by the chemical reactions of the cell element 28 may accumulate within the housing 26, which decreases the operability of the battery 24. However, the current collector 36 includes features that allow the vent disk 46 to move away from the housing 26, thereby creating an opening through which the gases may escape the housing 26.

Figure 5:
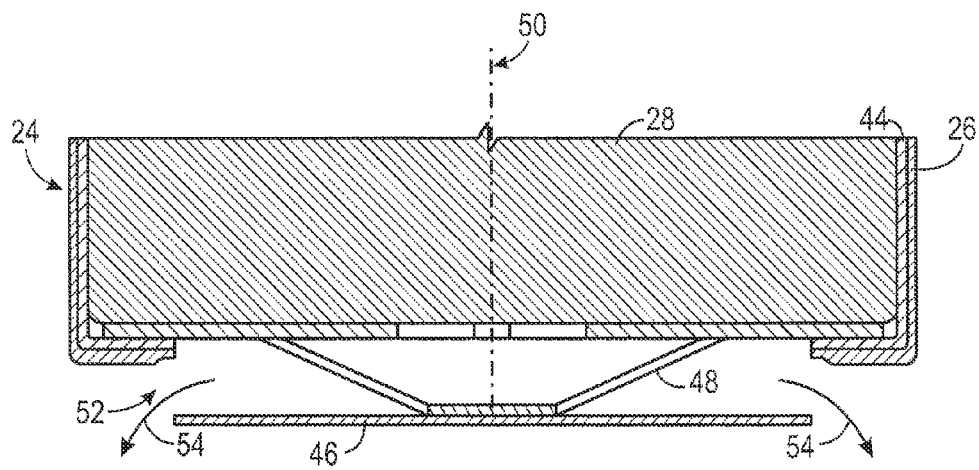
FIG. 5 is a partial cross-sectional view of an embodiment of the battery of FIG. 3, illustrating a current collector in an extended position to release gases produced by the battery.

To illustrate the opening caused by movement of the vent disk 46, FIG. 5 illustrates the current collector 36 having at least one flexible leg 48 that can extend along an axis 50 of the battery 24. That is, the flexible leg 48 extends to allow the vent disk 46 to move away from the housing 26 in a direction generally along the longitudinal axis 50 of the battery 24 and of the current collector 36. Pressure or force applied by the accumulated gases within the housing 26 causes the flexible leg 48 to extend, thereby separating the vent disk 46 from the housing 26 and creating an opening 52 in the housing 26. The accumulated gases are then vented out of the housing through the opening 52, as shown by arrows 54. Notably, the opening 52 breaks the electrical connection between the positive and negative electrodes of the cell element 28, which reduces or stops current flow from the battery 24. This may be desirable, as a rapid accumulation of gases within the housing 26 can be indicative of an operating issue with the battery 24, such as an overcharge or an overvoltage.

As noted earlier, it is desirable for the current collector 36 to be simultaneously electrically conductive and able to move a suitable distance to create a large opening to vent gases quickly. When the current collector 36 is in a non-extended position (such as in FIG. 4), current from the battery flows through the current collector 36 to form an electrical circuit. Accordingly, a greater electrical conductivity (i.e., a lower electrical resistance) improves the ability of current to flow through the current collector 36, thereby improving the efficiency of the battery 24. At the same time, a larger opening 52 results in a higher rate of venting the gases from the housing 26. The presently disclosed embodiments are directed to features of the current collector 36 to provide the larger opening 52 and to improve the electrical conductivity of the current collector 36.

Figure 6:
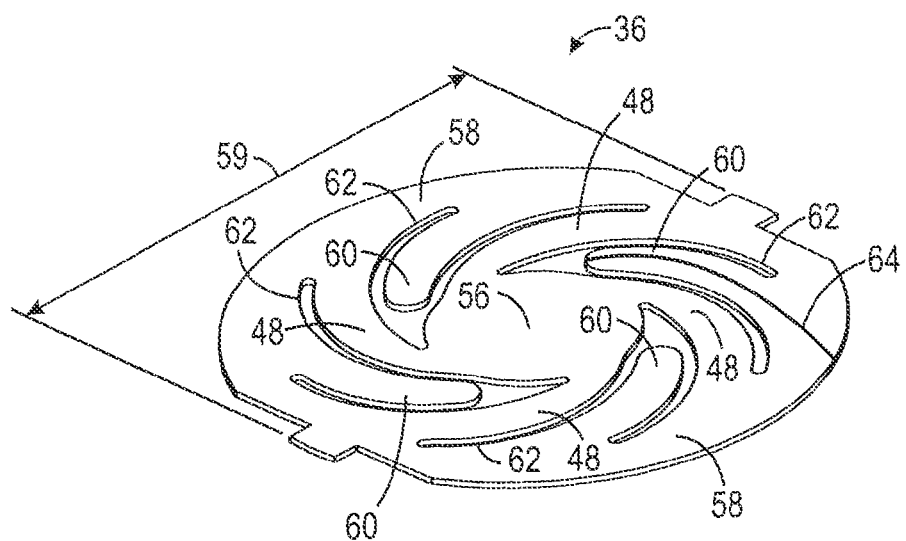
FIG. 6 is a perspective view of an embodiment of the current collector of FIGS. 4 and 5 with flexible legs and fixed legs to provide a larger opening and improve the electrical conductivity of the current collector.

To illustrate the improved electrical conductivity of the current collector, FIG. 6 illustrates an embodiment of the current collector 36 with features to improve its operability. As shown, the current collector 36 includes a substantially flat central portion 56 surrounded by a substantially flat outer portion 58. As used herein, the term "substantially flat" is not intended to limit the geometry of the current collector 36. For example, the current collector 36 may include protrusions, depressions, variations in thickness, and the like, which fall within the scope and spirit of the present disclosure.

As shown, the substantially flat outer portion defines an outer width 59. Although the illustrated central portion 56 is generally circular and the outer portion 58 is generally annular, the shapes of the respective portions may differ based on the shape of the battery 24. As noted earlier, the shape of the housing 26 may be cylindrical, prismatic, polyhedral, and the like. Accordingly, the shapes of the central portion 56 and the outer portion 58 may be generally circular, polygonal, annular, and the like.

As noted above, it is desirable to provide the larger opening 52 and to improve the electrical conductivity of the current collector 36. To provide electrical conductivity, the current collector 36 may be constructed from aluminum or another conductive material. To provide the larger opening 52, the current collector 36 is generally thin (e.g., approximately 0.8 cm thickness) to allow movement. However, it should be noted that the aforementioned material of construction and thickness are given by way of example, and are not intended to be limiting.

In the illustrated configuration, the central portion 56 may be coupled to the vent disk 46 of FIGS. 4-5 and the outer portion 58 may be coupled to the cell element 28. Extension of the flexible legs 48 causes the vent disk 46 to separate from the battery housing 26, as noted previously. It should be noted that in alternative embodiments, the central portion 56 may instead be coupled to the cell element 28 while the outer portion 58 is coupled to the vent disk 46. Although the current collector 36 may be coupled to the battery 24 in different areas, extension of the flexible legs 48 in the direction generally orthogonal to the plane of the current collector 36 (i.e., generally parallel to the axis 50) still creates the opening 52, thereby enabling the vent gases to escape.

In addition to the flexible legs 48, the current collector 36 includes fixed legs 60 to improve the electrical conductivity of the current collector 36. The flexible legs 48 and fixed legs 60 are separated by a series of substantially circular grooves 62. Accordingly, the flexible legs 48 and fixed legs 60 are defined by partial lunar shapes (i.e., the area between the circular grooves 62). However, the shape of the grooves 62, the flexible legs 48, and the fixed legs 60 may differ, and may be any suitable shape, such as straight, a lune, a crescent, an oval, a polygon, etc.

As shown, the fixed legs 60 extend from the outer portion 58 toward the central portion 56. Notably, the fixed legs 60 are not coupled to the central portion 56. This enables the fixed legs 60 to be coupled to the cell element 28 and to provide electrical contact between the cell element 28 and the battery housing 26, such as by welding, conductive adhesive, etc. In contrast, the flexible legs 48 extend from the outer portion 58 to the central portion 56 and are coupled to the central portion 56. This enables the flexible legs 48 to provide relative movement between the central portion 56 and the outer portion 58 of the current collector 58, thereby creating the opening 52.

Advantageously, each of the legs 48 and 60 provide substantially singular functions. That is, the flexible legs 48 provide the larger opening 52, whereas the fixed legs 60 provide electrical contact between the cell element 28 and various parts of the battery 24. As a result, the larger opening 52 is provided and the electrical conductivity of the current collector 36 is improved.

The fixed leg 60 defines an electrical contact length 64, as measured from the outer portion 58 to the end of the groove 62. In certain embodiments, the electrical contact length 64 may be provided by, for example, a laser weld that conductively couples the fixed leg to the cell element 28. The fixed leg 60 is designed such that the electrical contact length 64 is at least 30 percent of the outer width 59 of the outer portion 58. For example, the outer width 59 of the current collector 36 may be approximately 50 mm, and the electrical contact length 64 may be approximately 15 mm. However, depending on the design of the current collector 36, the electrical contact length 64 may vary. For example, in the embodiments illustrated by FIGS. 6-13, the electrical contact length 64 may be between 35 and 75 percent, or 45 and 55 percent of the outer width 59. The improved electrical contact length 64 increases the electrical conductivity of the current collector 36, thereby improving the operability of the battery 24.

Figure 7:
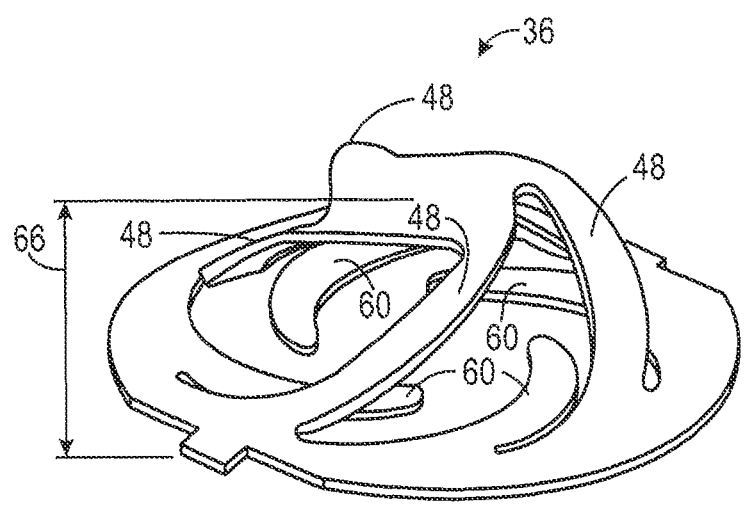
FIG. 7 is a perspective view of an embodiment of the current collector of FIG. 6 in an extended position.

The larger opening 52 provided by the flexible legs 48 is shown in FIG. 7, which illustrates the current collector 36 in an extended position (such as in FIG. 5). Notably, the fixed legs 60 retain their original positions, whereas the flexible legs 48 extend in a direction generally orthogonal to the plane of the current collector 36 (e.g., orthogonally to the central portion 56 or the outer portion 58). In particular, the flexible legs 48 and the central portion 56 move a distance 66 when a force is applied between the central portion 56 and the outer portion 58. In the illustrated embodiment, the distance 66 is at least 16 percent of the outer width 59 of the outer portion 58 in response to a 1000 Newton load, as determined by finite-element analysis (FEA). For example, the outer width 59 of the current collector 36 may be approximately 35 mm, and the distance 66 may be approximately 12 mm. However, depending on the design of the current collector 36, the distance 66 that the flexible legs 48 extend may vary. For example, in the embodiments illustrated by FIGS. 6-13, the distance 66 may be between 18 and 40 percent, or 25 and 38 percent of the outer width 59 when a 1000 Newton is applied between the central portion 56 and the outer portion 58.

It will be appreciated that the electrical contact length 64 and the distance 66 may be varied based on the design of the fixed legs 60 and the flexible legs 48, respectively. Thus, although the current collector 36 illustrated by FIG. 7 includes an equal number of fixed legs 60 and flexible legs 48 (i.e., 4 of each), certain embodiments may include a differing number of fixed legs 60 and/or flexible legs 48 to achieve a desired opening size and/or electrical conductivity for the current collector 36. In general, the current collector includes at least one flexible leg 48 (i.e., 1, 2, 3, 4, or more) and may include 1, 2, 3, 4, or more fixed legs 60, as is illustrated by the embodiments of FIGS. 8-13. In certain embodiments, as illustrated by FIG. 10, the current collector may not include any fixed legs 60.

Figure 8:
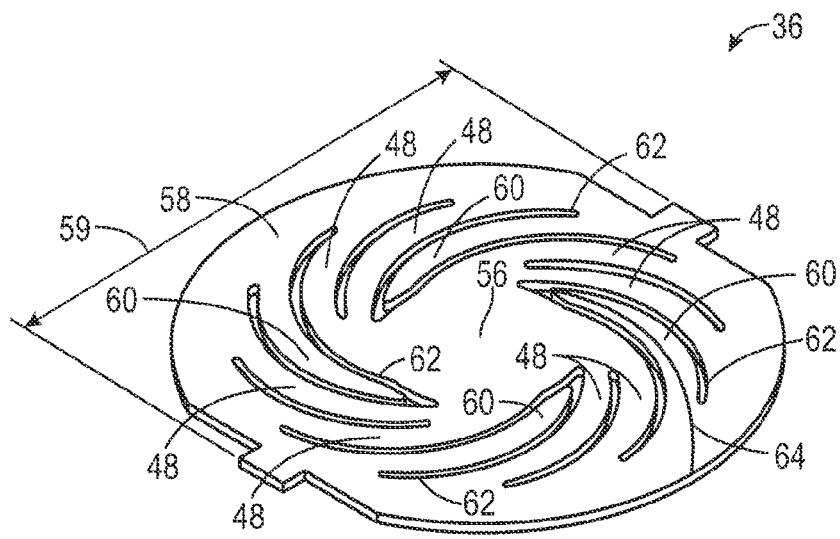
FIG. 8 is a perspective view of another embodiment of the current collector of FIGS. 4 and 5 with a differing number of flexible legs and fixed legs.
Figure 9:
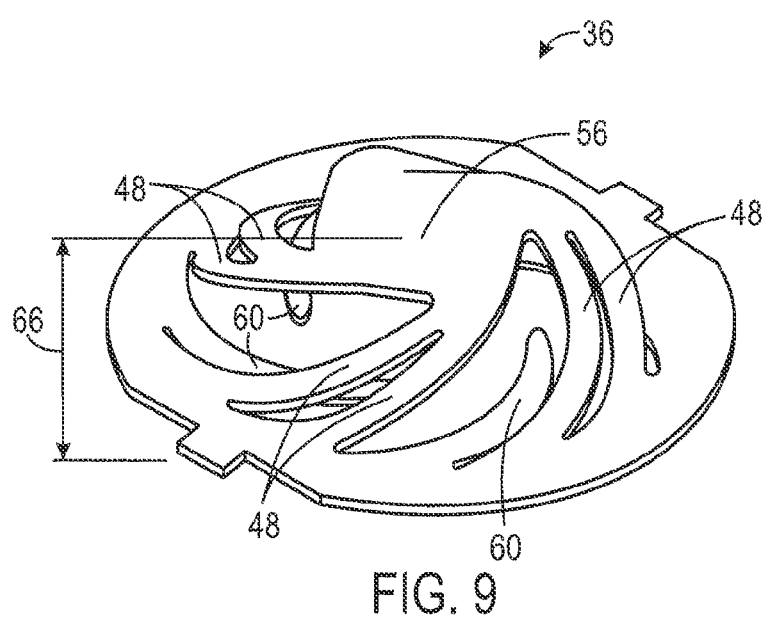
FIG. 9 is a perspective view of an embodiment of the current collector of FIG. 8 in an extended position.
Figure 10:
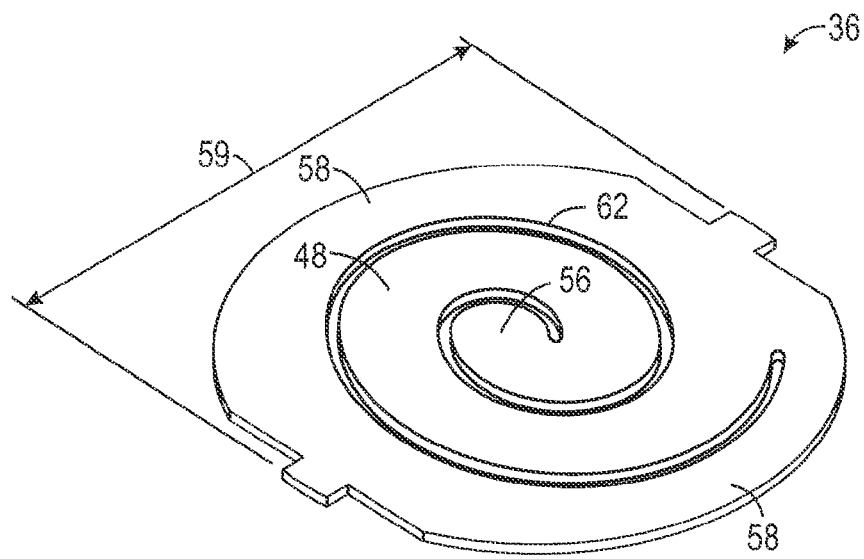
FIG. 10 is a perspective view of another embodiment of the current collector of FIGS. 4 and 5 with a single flexible leg.

To illustrate the effects of varying flexible legs 48, FIGS. 8-9 illustrate an embodiment of the current collector 36 having eight flexible legs 48 and four fixed legs 60. The additional flexible legs 48 improve the overall mechanical strength of the current collector 36. As shown, the flexible legs 48 extend the distance 66 orthogonally to the current collector 36, and the distance 66 is at least 16 percent of the outer width 59 of the current collector. For example, in the illustrated embodiment, the outer width 59 is approximately 35 mm, and the distance 66 is approximately 6 mm. In certain embodiments, the distance may be between 18 and 40 percent, or 25 and 38 percent of the outer width 59 when a 1000 Newton is applied between the central portion 56 and the outer portion 58. Thus, based on the embodiments of FIGS. 6-13, one of ordinary skill in the art would immediately recognize that the distance 66 may be modified by changing the number of flexible legs 48.

To illustrate the minimum number of flexible legs 48, FIG. 10 is a perspective view of another embodiment of the current collector 36 having a single flexible leg 48 in a spiral arrangement. Notably, the current collector 36 does not include a fixed leg 60. Accordingly, the outer portion 58 may provide the entirety of the electrical contact between the cell element 28 and the housing 26. The illustrated embodiment provides the flexible leg 48 with a greater length relative to the outer width.

Figure 11:
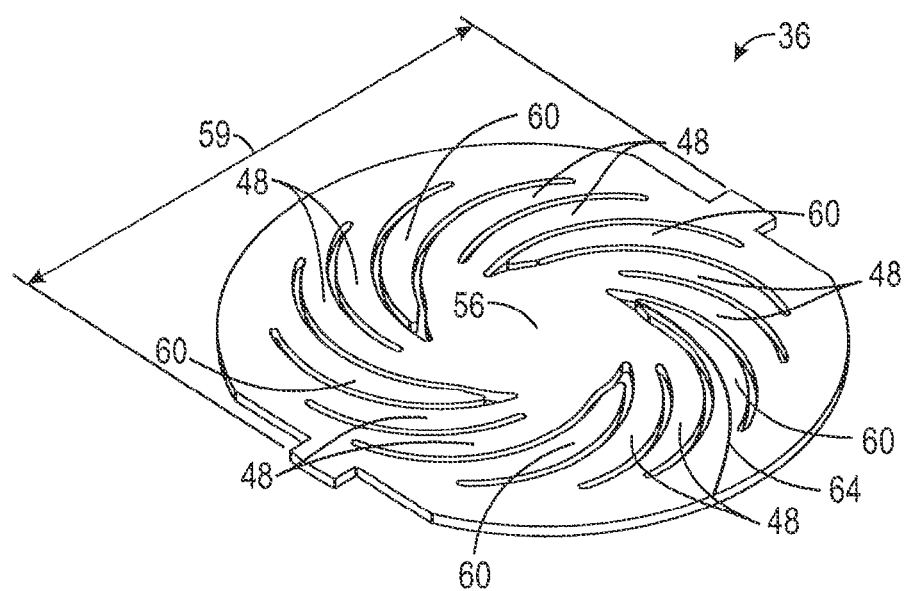
FIG. 11 is a perspective view of another embodiment of the current collector of FIGS. 4 and 5 with two flexible legs and two fixed legs.

FIG. 11 illustrates an embodiment of the current collector 36 having 10 flexible legs 48 and five fixed legs 60. As shown, the fixed legs 60 define the electrical contact length 64, which is at least 30 percent of the outer width 59 of the outer portion 58. For example, the outer width 59 may be approximately 35 mm, and the electrical contact length 64 may be approximately 16 mm. A total electrical contact length may be defined as the sum of the electrical contact lengths 64 of each fixed leg 60. Increasing the total electrical contact length generally increases the electrical conductivity of the current collector 36. Thus, the total electrical contact length, and thus the electrical conductivity of the current collector 36, may be modified by changing the number of fixed legs 60.

Figure 12:
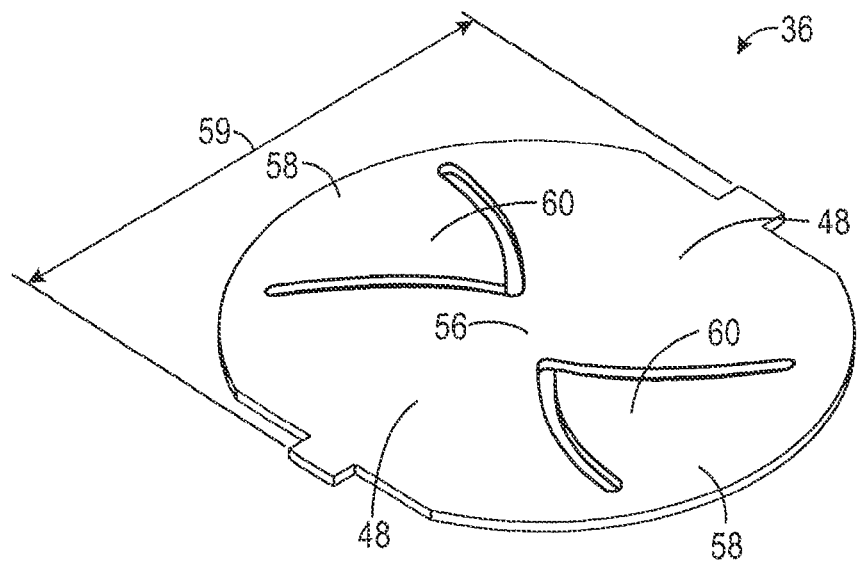
FIG. 12 is a perspective view of another embodiment of the current collector of FIGS. 4 and 5 with lunar-shaped flexible legs and fixed legs.

FIG. 12 is a perspective view of another embodiment of the current collector 36 having two flexible legs 48 and two fixed legs 60 in a generally symmetrical arrangement. The symmetrical arrangement of legs may reduce the amount of twisting (e.g., circumferential movement) of the flexible legs 48 as they extend to create the opening 52. This may be desirable, as it may increase the distance 66 that the flexible legs 48 extend when they are exposed to the 1000 Newton loading.

However, certain embodiments (such as in FIGS. 6 and 8) have the legs 48 and 60 disposed in an asymmetrical arrangement. Such an arrangement may increase the amount of circumferential twisting of the flexible legs 48 about the longitudinal axis 50 as they extend to create the opening 52, which may enable a smaller amount of force to create the opening 52. Accordingly, the symmetry or asymmetry of the legs may vary among embodiments. For example, the shape and symmetry of the legs may be based on various factors, such as the geometry, size, or application of the battery.

Figure 13:
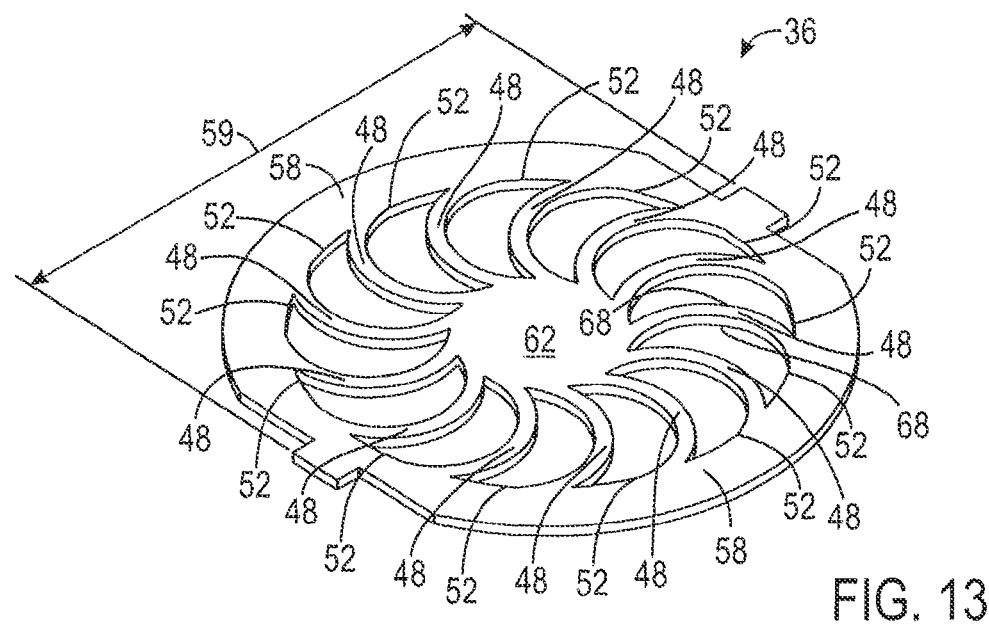
FIG. 13. Is a perspective view of another embodiment of the current collector of FIGS. 4 and 5 with features to provide a larger opening and improve the electrical conductivity of the current collector.

FIG. 13 illustrates another embodiment of the current collector 36 having the flexible legs 48 with arcuate sides 68. The arcuate sides 68 are defined by the grooves 62, which, in the illustrated embodiment, have crescent shapes. In other words, the sides 68 are generally circular, but may have varying radii. As noted earlier, the shape of the legs 48 and 60, as well as the corresponding grooves 62, are a design choice and may vary among embodiments. For example, the legs 48 and 60 may be arcuate, lunar, straight, or otherwise polygonal, and the grooves 62 may be arcuate, lunar, crescent, polygonal, and the like.

What is claimed is:

1. A current collector, comprising:
    a substantially flat central portion;
    a substantially flat outer portion defining an outer width;
    at least one flexible leg extending directly from the substantially flat outer portion to the substantially flat central portion, wherein the at least one flexible leg is configured to allow the substantially flat central portion to move relative to the substantially flat outer portion in a direction generally parallel to an axis of the current collector, and wherein the at least one flexible leg is configured to move at least 16 percent of the outer width of the substantially flat outer portion in response to a 1000 Newton loading being applied between the substantially flat central portion and the substantially flat outer portion; and
    at least one fixed leg separate from the at least one flexible leg and defining an electrical contact length extending directly from the substantially flat outer portion toward the substantially flat central portion, wherein the electrical contact length comprises at least 30 percent of the outer width of the substantially flat outer portion.

2. The current collector of claim 1, wherein the at least one flexible leg is configured to move between 18 and 40 percent of the outer width in response to the 1000 Newton loading being applied between the substantially flat central portion and the substantially flat outer portion.

3. The current collector of claim 2, wherein the at least one flexible leg is configured to move between 25 and 38 percent of the outer width in response to the 1000 Newton loading being applied between the substantially flat central portion and the substantially flat outer portion.

4. A battery comprising:
    a cell element disposed within a housing;

a vent disk coupled to the housing; and
a current collector, comprising:
- a substantially flat central portion coupled to the vent disk;
- a substantially flat outer portion coupled to the cell element and defining an outer width;
- at least one flexible leg extending directly from the substantially flat outer portion to the substantially flat central portion and configured to allow the substantially flat central portion to move relative to the substantially flat outer portion in a direction generally parallel to an axis of the current collector; and
- at least one fixed leg separate from the at least one flexible leg, coupled to the cell element and defining an electrical contact length extending directly from the substantially flat outer portion toward the substantially flat central portion, wherein the electrical contact length comprises at least 30 percent of the outer width of the substantially flat outer portion.

5. The battery of claim 4, wherein the electrical contact length is between 35 and 75 percent of the outer width of the substantially flat outer portion.

6. The battery of claim 5, wherein the electrical contact length is between 45 and 55 percent of the outer width of the substantially flat outer portion.

7. The battery of claim 4, wherein the at least one flexible leg is configured to move between 18 and 40 percent of the outer width in response to a 1000 Newton loading being applied between the substantially flat central portion and the substantially flat outer portion.

8. The battery of claim 4, wherein the at least one flexible leg comprises a plurality of flexible legs and the at least one fixed leg comprises a plurality of fixed legs, and wherein a combination of the plurality of flexible legs and the plurality of fixed legs defines a total number of legs.

9. The battery of claim 8, wherein the plurality of flexible legs comprises at least half of the total number of legs.

10. The battery of claim 9, wherein the plurality of flexible legs and the plurality of fixed legs comprise an equal number of legs.

11. A vehicle, comprising:
a motor configured to provide motive power; and
a battery configured to at least partially power the motor, wherein the battery comprises a cell element disposed within a housing, a vent disk coupled to the housing, and a current collector, comprising:
- a substantially flat central portion coupled to the vent disk;
- a substantially flat outer portion coupled to the cell element and defining an outer width;
- at least one flexible leg extending directly from the substantially flat outer portion to the substantially flat central portion and coupled to the substantially flat central portion, wherein the at least one flexible leg is configured to allow the substantially flat central portion to move relative to the substantially flat outer portion in a direction generally parallel to an axis of the current collector; and
- at least one fixed leg separate from the at least one flexible leg, coupled to the cell element and extending directly from the substantially flat outer portion toward the substantially flat central portion.

12. The vehicle of claim 11, wherein the at least one fixed leg defines an electrical contact length from the substantially flat outer portion toward the substantially flat central portion, wherein the electrical length comprises at least 30 percent of the outer width of the substantially flat outer portion.

13. The vehicle of claim 12, wherein the electrical contact length is between 45 and 55 percent of the outer width of the substantially flat outer portion.

14. The vehicle of claim 11, wherein the at least one flexible leg is configured to move at least 16 percent of the outer width in response to a 1000 Newton loading being applied between the substantially flat central portion and the substantially flat outer portion.

15. The vehicle of claim 14, wherein the at least one flexible leg is configured to move between 18 and 40 percent of the outer width in response to the 1000 Newton loading being applied between the substantially flat central portion and the substantially flat outer portion.

16. The vehicle of claim 11, wherein the at least one flexible leg and the at least one fixed leg comprise substantially lunar shapes.

* * * * *